April 24, 1956
L. B. DOWTY
2,743,077
AUTOMATIC DUMPING SELECTOR
Filed Aug. 28, 1953
6 Sheets-Sheet 1
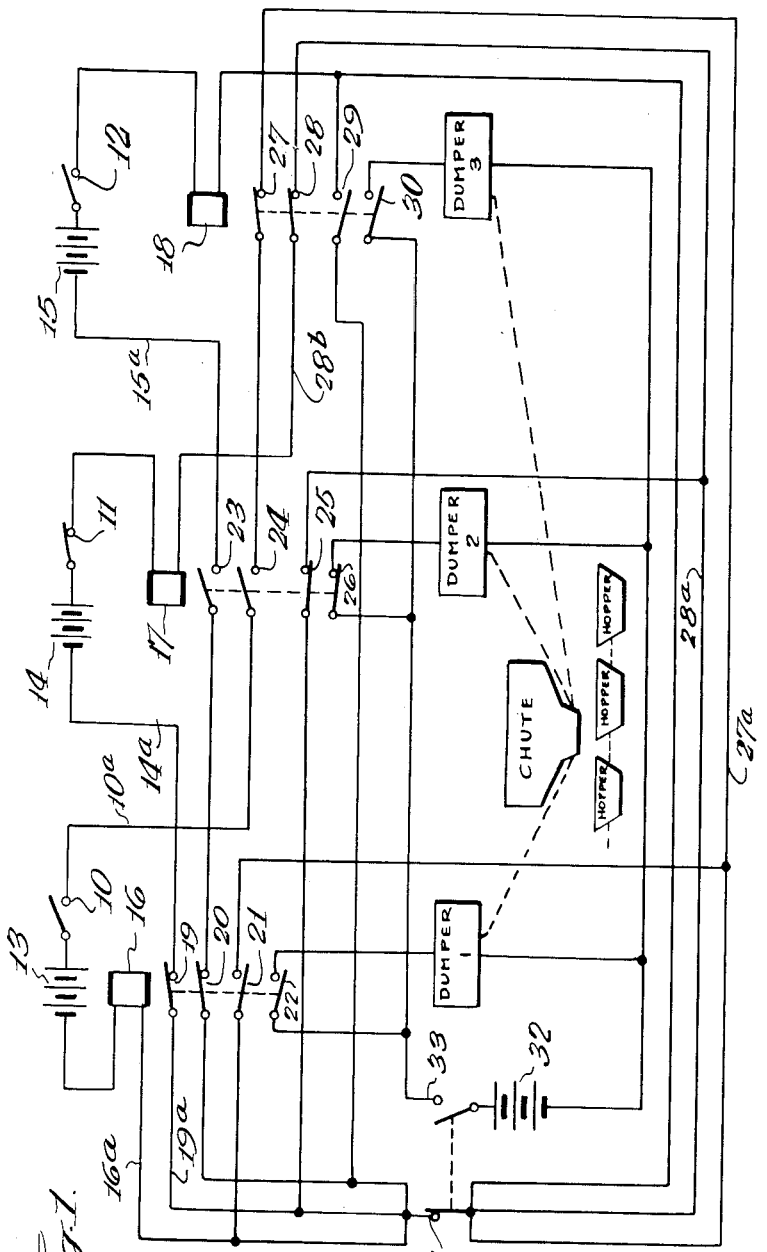
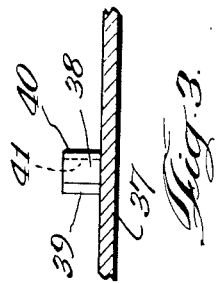
Inventor
Lee B. Dowty
By Schroeder, Merriam, Hofgren & Brady
attorneys

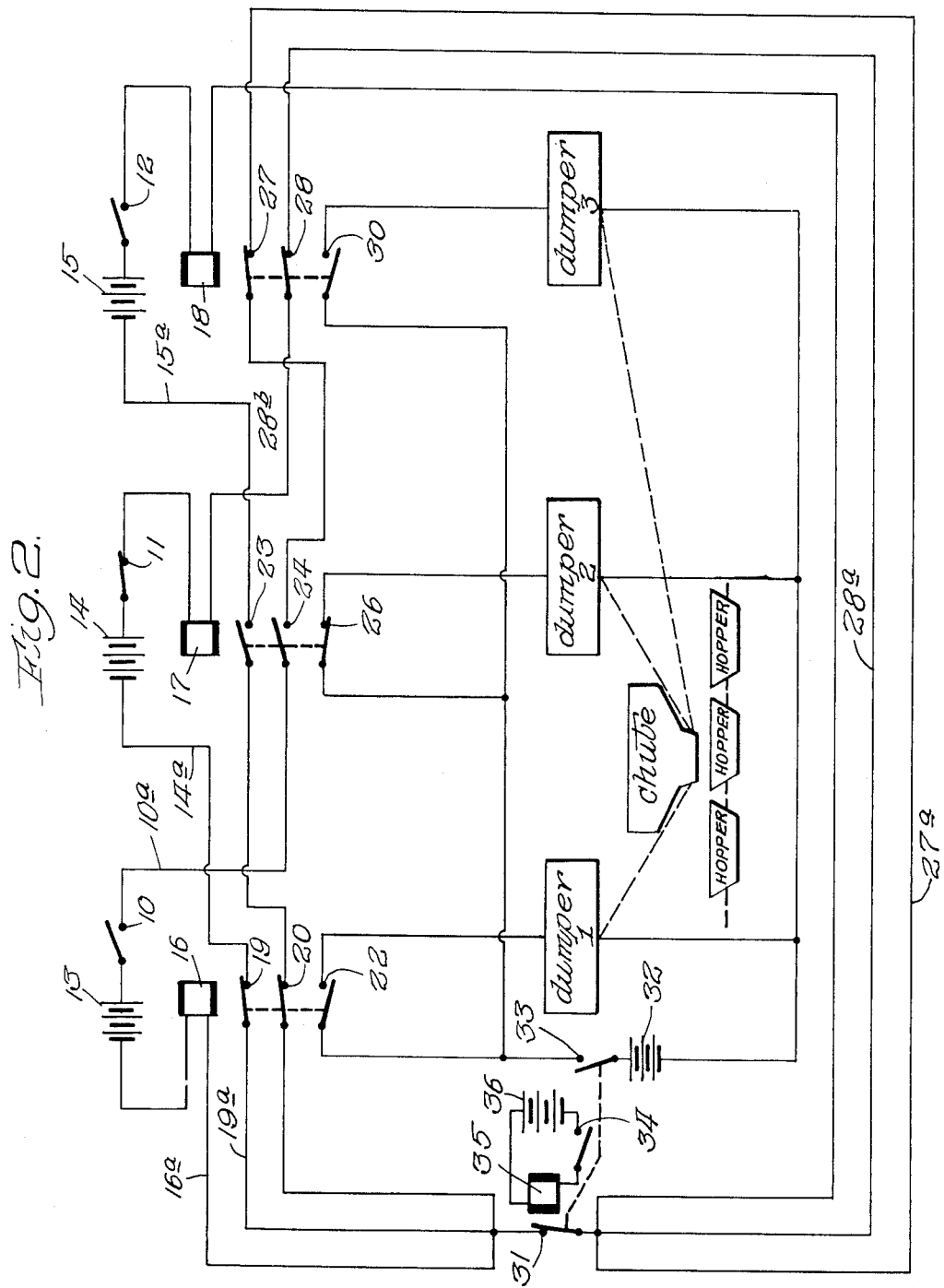

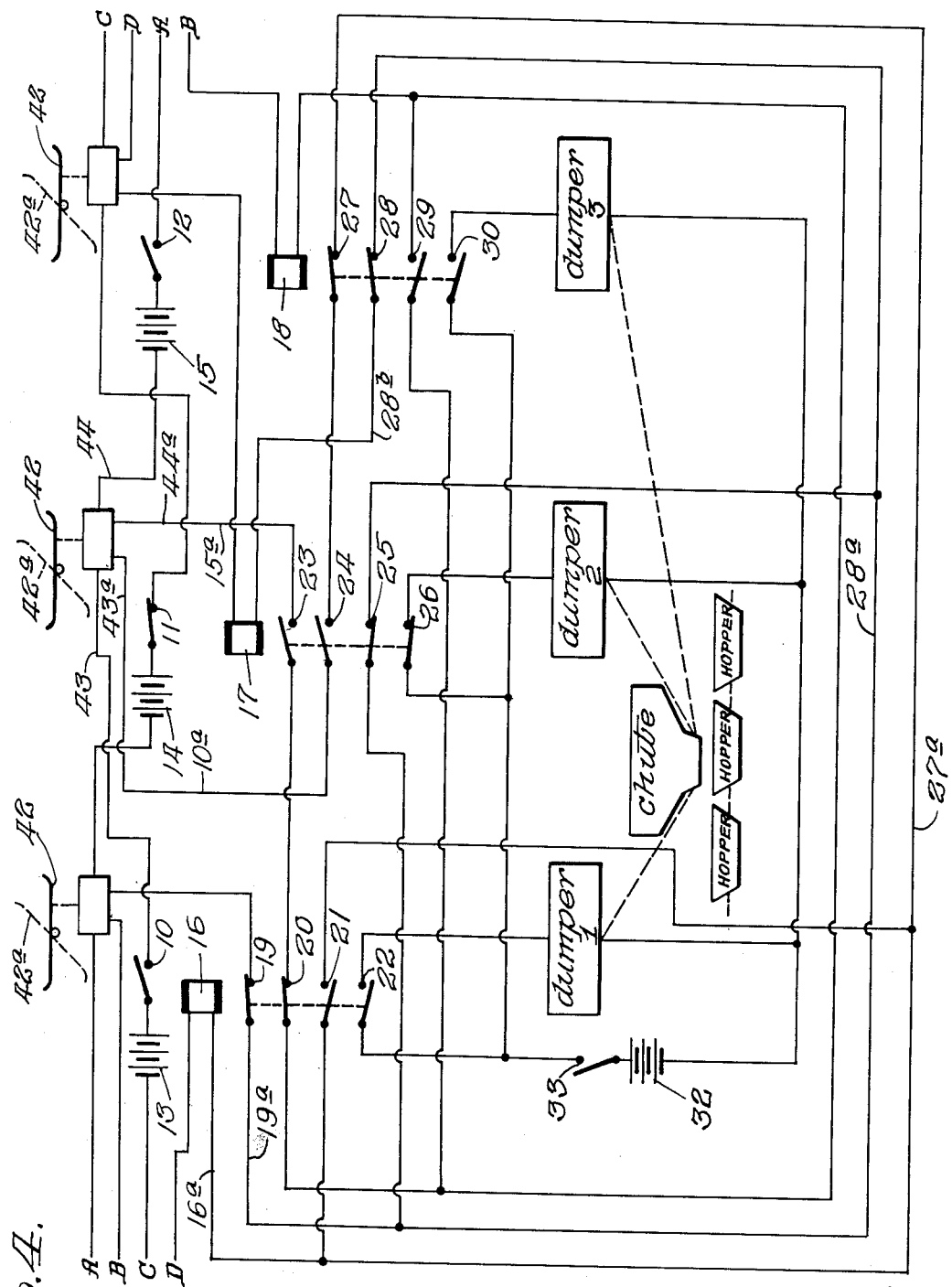

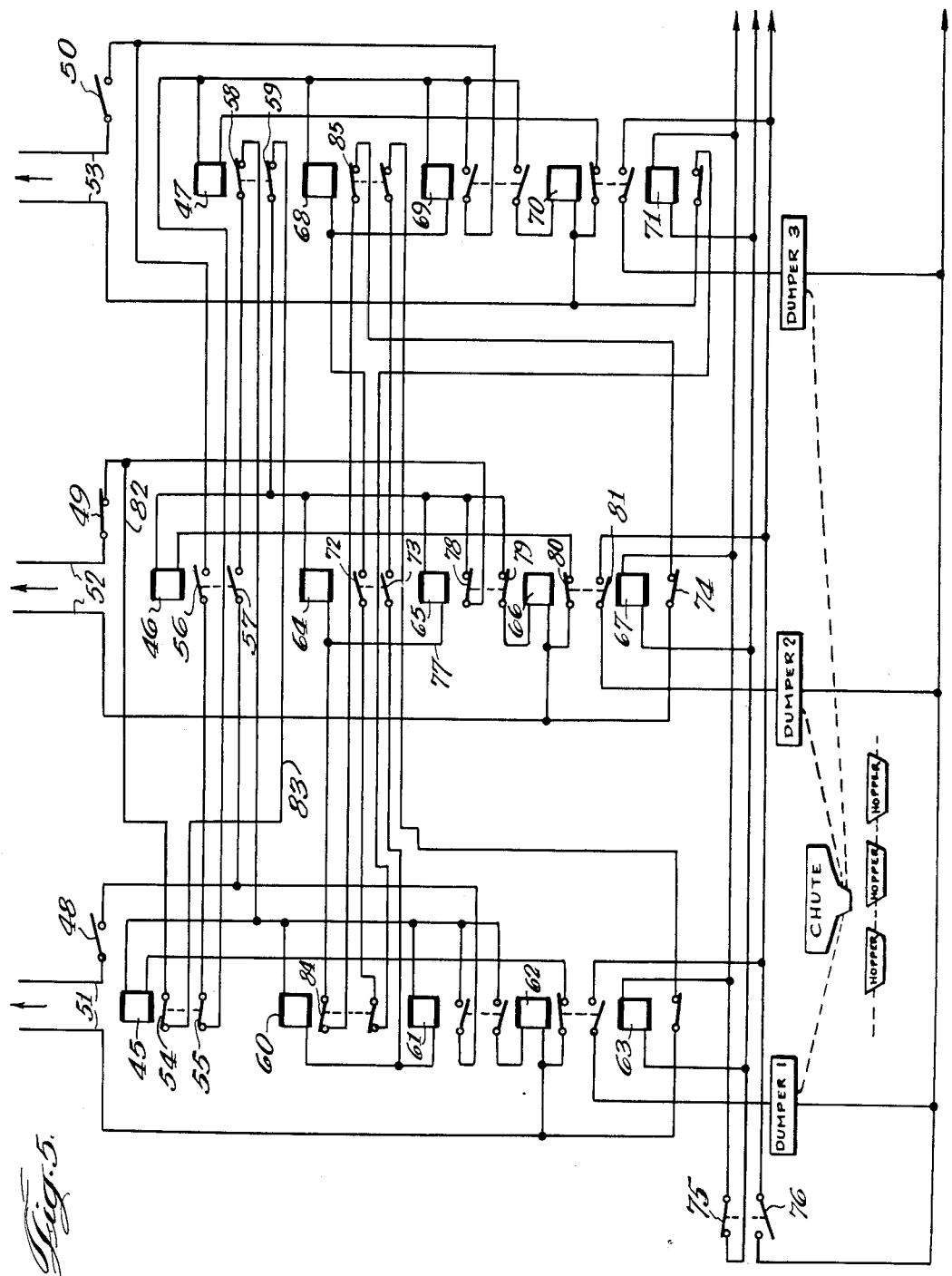

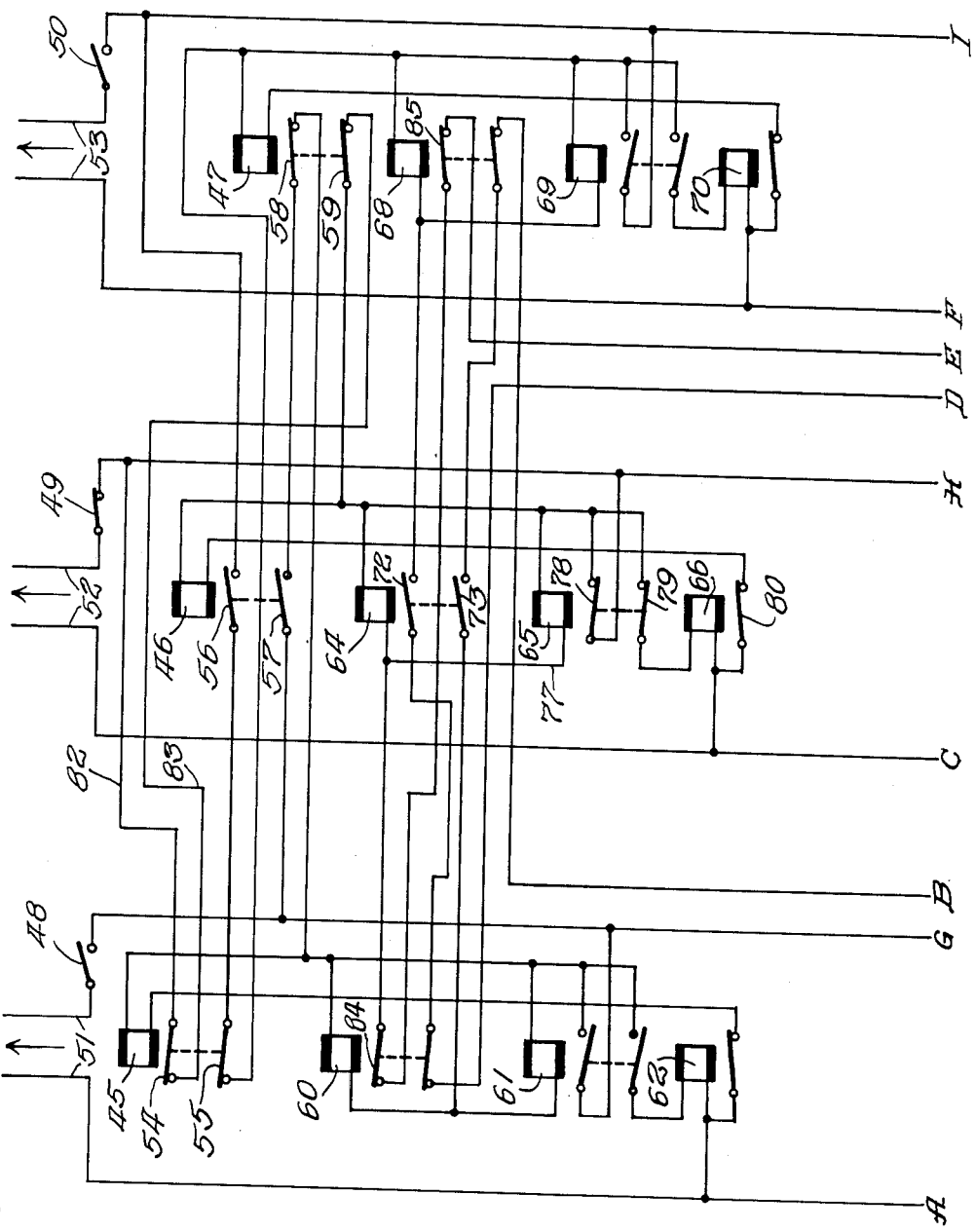

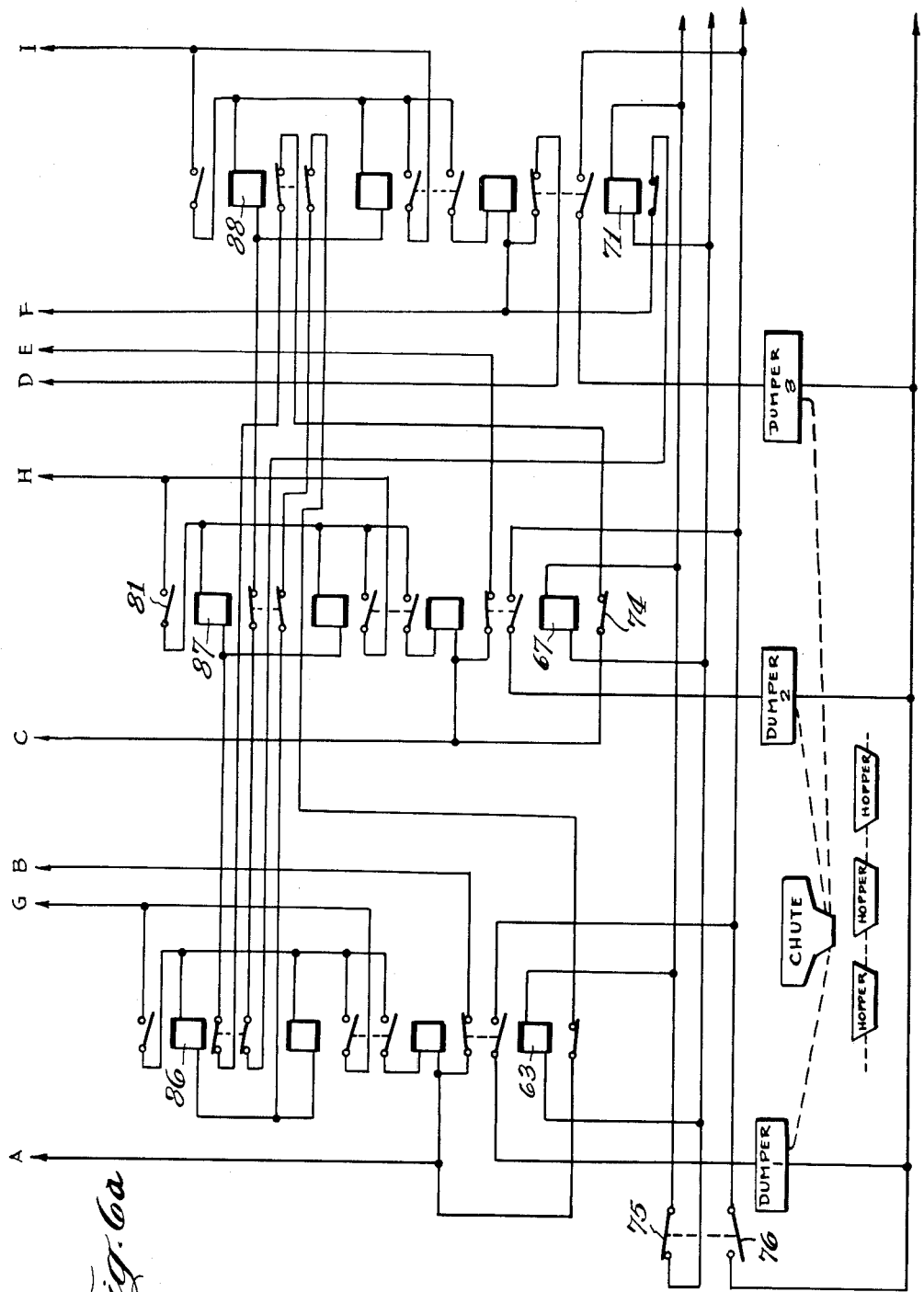

United States Patent Office 2,743,077
Patented Apr. 24, 1956

2,743,077
AUTOMATIC DUMPING SELECTOR

Lee B. Dowty, Pryor, Okla., assignor to Spencer Chemical Company, a corporation of Missouri Application August 28, 1953, Serial No. 377,113

11 Claims. (Cl. 249—22)

This invention relates to an automatic dumping selector for use with a plurality of scales, and more particularly to a selector that causes the scales to be dumped in the order in which they are brought into balance and at the same time prevents any scale from dumping its contents, even though it is in balance, if another scale has already filled the container which is in position at the moment to receive a load from a scale pan.

Automatic scale selectors for use in filling a series of containers permit the various scale pans to be dumped only when they contain a predetermined weight of material. This keeps the contents of each of the containers at a uniform desired weight.

However, automatic scale selectors in use at present generally have the disadvantage of permitting the various scales to be dumped only in an arbitrary sequence. The first pan must be dumped before the second one can be dumped, the second must be dumped before the third can be dumped, etc.

Sometimes a particular scale for some reason takes longer than usual to come to balance. A container may then be presented to the scales for filling and be moved beyond the filling position before the scale in question is ready for dumping. If the scale happens to be the next one in the arbitrary dumping sequence just referred to, the container will be skipped altogether by the dumping apparatus, and will move along the production line empty.

The present invention avoids this difficulty by causing the scales to be dumped not in any arbitrary sequence but rather in the order in which they come into balance. This means that as a practical matter the possibility of ever having an empty container coming out from under the dumping scales is eliminated.

Because the scales may be dumped just as soon as they come into balance instead of having to "wait their turn," the present invention must necessarily act to permit only one scale pan to be dumped into a single container. Therefore, the invention is so arranged that any scale pan which comes into balance after another scale pan has been dumped and while the receiving container is still in its receiving position is automatically caused to wait for dumping until the next container in the series arrives for filling.

The invention will be described in relation to the embodiments in the accompanying drawings. In the drawings;

Figure 1 is a combination circuit and schematic diagram showing one embodiment of this invention;

Figure 2 is a combination circuit and a schematic diagram showing another embodiment of this invention;

Figure 3 is a fragmentary plan view of part of a receiving container, showing a device which when added to the structure of Figure 1 forms a third embodiment;

Figure 4 is a combination circuit and schematic diagram showing another embodiment;

Figure 5 is a combination circuit and schematic diagram showing another embodiment of this invention; and Figures 6 and 6a taken together with the latter placed below Figure 6 illustrate a combination circuit and schematic diagram illustrating another embodiment.

*Automatic dumpers.*—The automatic dumping selectors shown in the drawings are for use with a group of scales (not shown) three in number. Each of the scales has associated with it an automatic dumper which, when actuated by the dumping selector of this invention, causes its scale pan to tip and so to dump the contents of the pan.

The dumpers are indicated schematically in the drawings. Each dumper has a trigger condition in which the application of a single electrical impulse will cause it to dump its associated scale pan. The circuit for an automatic dumper of this kind is not shown because it is well known to those skilled in the art.

When dumped, each scale pan empties at a predetermined position and preferably into a common chute means, positioned below the scales and, which leads to a single discharge opening. Obviously the chute means could be a separate chute as shown, or the sides of the hoppers, or containers in the hoppers, or other component parts of the assembly. A series of hoppers or other containers are provided to move automatically along beneath the chute opening. The chute and hoppers are shown schematically in the drawings.

As each hopper passes beneath the chute opening, it occupies at least one position in which it can receive the contents of a scale pan when the contents are dumped into the chute. For convenience, the hoppers should have mouths that are somewhat larger than the discharge opening at the bottom of the chute. This will mean that if the hopper moves relatively slowly beneath the chute opening—as it ordinarily will—each hopper will in fact have several positions in which it can receive the contents of a scale pan. These are called "receiving positions" in this application.

First embodiment

*Balance switches.*—In Figure 1, balance switch 10 is connected operatively with the first scale pan. Similar switches 11 and 12 are connected with the second and third scale pans, respectively. Each of these switches is normally open, and adapted to be closed when the contents of the scale pan equal at least a predetermined weight. The switches may be, for example, pressure responsive switches that are pressed into a closed position when the scale pan is caused by the appropriate weighting of its contents to be lowered to the necessary position.

Each of the balance switches is connected in series with a separate source of electrical energy. These are sources 13, 14, and 15, respectively.

*Cocking relays or readying means.*—Also in series with electrical energy source 13 is the energizing coil of cocking relay 16. Similarly, source 14 is connected in series with cocking relay 17, and source 15 with cocking relay 18.

Relay 16 has two normally closed contacts 19 and 20, and two normally open contacts 21 and 22. The movable elements of these four contacts are ganged for simultaneous action.

Relay 17 also has two normally closed contacts 23 and 24, and two normally open contacts 25 and 26, all ganged. Similarly, relay 18 has four ganged contacts—normally closed contacts 27 and 28 and normally open contacts 29 and 30.

*Interlock circuits.*—Balance switch 10 is connected in series with contacts 24 and 27, and also with normally closed blocking switch 31 (shown at the left in Figure 1). The other side of switch 31 is connected in series with bottom lead 16a from the energizing coil of relay 16. This forms an interlock circuit connecting cocking relay 16 with each of the other cocking relays and with blocking switch 31.

Blocking switch 31 is adapted to be opened whenever a hopper moves into position under the chute to receive the contents of any scale pan. The switch may be, for example, a pressure responsive switch which breaks the circuit at this point when actuated by a lug extending from the side of each hopper.

Balance switches 11 and 12 are each part of a circuit similar to that just described for balance switch 10. Thus, each of the balance switches is connected in series with its associated source of electrical energy; a normally closed contact of each of the other two cocking relays; normally closed blocking switch 31; and the energizing coil of the cocking relay associated with the balance switch.

*Holding contact for first scale.*—Normally open contact 21 closes whenever cocking relay 16 is energized. It is connected in parallel across blocking switch 31, being attached to lead 16a from relay 16 and to lead 27a which runs to contact 27 of relay 18.

*Connecting means for first scale.*—Normally open contact 22 closes when relay 16 is energized. It is connected in series with dumper 1, and together with that dumper is connected across electrical energy source 32 and triggering switch 33. Dumper 1 is so arranged that when contact 22 is closed the dumper is placed in its trigger condition.

*Triggering switch.*—Normally open triggering switch 33 closes when a hopper comes into its first receiving position under the chute. If desired, the "lead time" of any moving hopper may be taken into account in establishing the "first receiving position" of the hoppers. (This may be desirable if the time required for actuating a dumper and starting the dumping of a scale pan is appreciable.) However, in such case provision must of course be made for stopping the operation of any actuated dumper if for any reason the moving line of hoppers comes to a stop.

Triggering switch 33 may be a pressure responsive switch or any other suitable switch. Its moveable element may be ganged with the moveable element of blocking switch 31 (as shown in Figure 1) so that it will close simultaneously with the opening of that switch.

When dumper 1 has been placed in its trigger condition, the application of electrical energy from source 32 when triggering switch 33 is closed actuates the dumper, and the scale pan of the first scale is dumped.

*Corresponding circuits for other scales.*—Contacts 25 and 26 of relay 17 and contacts 29 and 30 of relay 18, respectively, are connected across blocking switch 31 and to their respective dumpers in the same manner as just described for contacts 21 and 22 of relay 16.

Thus, when contact 26 is closed dumper 2 will be actuated by the closing of switch 33, and when contact 30 is closed dumper 3 will be actuated by the closing of switch 33.

*Operation.*—To illustrate the operation of the dumping selector of Figure 1, the circuit is shown in the condition it will occupy after the second scale has come into balance, but before a hopper has arrived under the chute opening for filling. The first and third scales are not yet in balance.

As soon as balance switch 11 is closed by the balancing of the second scale, electrical energy from source 14 flows through the energizing coil of cocking relay 17, normally closed contact 28, lead 28a, normally closed blocking switch 31, lead 19a, normally closed contact 19, and lead 14a. This energizes relay 17 and causes normally closed contacts 23 and 24 to open, thereby rendering cocking relays 16 and 18 inoperative.

At the same time, the energizing of relay 17 causes normally open contact 26 to close, thereby placing dumper 2 in its trigger condition. Thus, when a hopper comes into its receiving position and closes triggering switch 33, dumper 2 is actuated and dumps the scale pan of the second scale.

It is seen that contact 26 will remain closed and dumper 2 therefore will be in condition to be actuated, so long as relay 17 remains energized. In the embodiment shown in Figure 1, the arrival of a hopper in its receiving position not only closes triggering switch 33 but opens blocking switch 31, since the two switches operate simultaneously. If dumper 2 did not have time to be actuated before switch 31 is opened, this would de-energize relay 17 if some holding means were not provided to keep the coil of the relay energized.

Holding contact 25 is provided for this purpose. When closed, it shunts out switch 31, and provides a direct connection between leads 19a and 28a, so long as balance switch 11 remains closed and relay 17 energized.

When the scale pan for the second scale is dumped by dumper 2, this opens switch 11 and de-energizes relay 17. Holding contact 25 is then opened, along with contact 26.

The de-energizing of relay 17 permits contacts 23 and 24 to return to their normally closed positions. The circuits interlocking the three cocking relays are then once again completed, except for switch 31, which remains open as long as the hopper which has already been filled remains under the chute opening.

As soon as the filled hopper has moved on, switch 31 closes again and the interlocking circuits are completed.

Balance switch 10, for example, may have become closed in the meantime by the balancing of the first scale. Relay 16 will then be energized as relay 17 was before, and dumper 1 will be placed in its trigger condition as dumper 2 was before. This time cocking relays 17 and 18 will be rendered inoperative so long as dumper 1 is not actuated and relay 16 remains energized.

*Effect of automatic selection.*—From the above it is seen that the first result of this invention is that any of the three dumpers may be placed in its trigger condition and its associated scale pan dumped, no matter in what order the scales come into balance.

As soon as one of the cocking relays has been energized, it locks out the other two cocking relays through a system of interlocks, and keeps them locked out until its associated scale pan is dumped. The scale pan is dumped as soon as a hopper is moved under the chute opening. At the same instant, switch 31 is opened, and remains so until the filled hopper has passed from under the chute opening.

Thus, a second result of this invention is that it avoids the possibility of ever having more than one scale pan dumped into the same hopper, even though more than one scale is in balance while the hopper is in a receiving position under the chute.

Second embodiment

In a second embodiment of this invention, holding contacts 21, 25 and 29 are unnecessary and may be eliminated. In this embodiment, blocking switch 31 is adapted to open (a) slowly enough that any energized cocking relay will remain in that condition long enough to permit its associated dumper to be triggered, but (b) not so slowly that a second cocking relay may be energized after the interlock effect of the first relay is removed by the opening of its balance switch when the associated scale pan is dumped.

This embodiment is illustrated in Figure 2. As already explained, cocking relay 17 is shown in its energized condition. Assume that the third scale comes into balance and switch 12 closes before the second scale pan is dumped. (Cocking relay 18 is not energized at this moment, however, because it is locked out by the interlock circuit that includes contact 23 of relay 17.)

When triggering switch 33 is closed, the electrical impulse from source 32 sets in motion the following chain of events: (1) dumper 2 is actuated; (2) relay 17 is de-energized when balance switch 11 is opened as the associated scale pan is dumped; (3) contact 23 resumes its normal closed position after relay 17 is de-energized; and (4) normally open contact 30 closes as cocking relay 18 is energized (due to the closing of contact 23, and the closing of balance switch 12 as assumed above).

If switch 31 of Figure 1 is, for example, a time delay switch of any conventional type, it may be arranged to remain closed after the arrival of a hopper in receiving position for a long enough time that dumper 2 can be actuated. Figure 2 shows one arrangement by which this may be done. Switch 34 is a pressure responsive switch that is closed by the arrival of a hopper. Relay 35 is energized by electrical energy from source 36 a short time (the exact length of time depending on the impedance of the coil of relay 35) after switch 34 is closed. The time lag in the opening of blocking switch 31 after the closing of switch 34 (and of triggering switch 33) permits dumper 2 to be actuated.

The time lag must be so regulated however, that it is less than the time required for the four steps described above which occur upon the closing of triggering switch 33.

Third embodiment

Figure 3 shows other means for causing blocking switch 31 to open the required period of time after triggering switch 33 has been closed. It should be read together with Figure 1, again with contacts 21, 25 and 29 removed, together with the leads to those contacts.

Attached to wall 37 of each hopper are two lugs 38 and 39. Lug 38 operates pressure responsive switch 33. Lug 39 operates pressure responsive switch 31. As the hopper moves to the right in Figure 3 in relation to the switches, the lugs successively actuate their respective switches.

Leading edge 40 of lug 38 and leading edge 41 of lug 39 are so disposed that switch 31 is actuated the appropriate period of time after switch 33.

It is seen that this embodiment may be employed only if the total time required for the four steps described above is not too small, since the difference in the positions of leading edges 40 and 41 must in any case be very slight.

Fourth embodiment

*Scale first balanced after hopper present.*—The action of blocking switch 31 will reduce considerably the time available for placing the automatic dumper of a balanced scale in its trigger condition, if the period of time a hopper is in position under the scales to receive the contents of a scale pan is relatively long. This will be the case, for instance, if it is desired to move the series of hoppers under the chute discharge opening fairly slowly, or if the filling opening of each hopper is for some reason required to be fairly long in comparison to the distance between successive hoppers.

In any such case, it may be desired to permit a scale to be dumped (if the hopper has not already been filled) even if it does not come into balance until after a hopper is in its receiving position. This will further reduce the possibility that a hopper would ever be presented for filling and pass on empty from beneath the chute opening. (It will also reduce somewhat the possibility of having two scales in balance and prepared for the energizing of their cocking relays at the same instant—after a hopper moves away from the chute opening—which is discussed below in the section headed "Seventh embodiment.")

*Additional dumping by another scale prevented.*—To permit a scale to come into balance and be dumped during the time a hopper is present under the chute, it is necessary to remove blocking switch 31 from the circuit of Figure 1. This means, of course, that switch 31 no longer prevents a second scale from being dumped into an already filled hopper. Therefore, it is a second purpose of this embodiment to provide that if a dumper is actuated at any time a hopper is present under the chute, another dumper may not thereafter be actuated until after the filled hopper has moved on.

*Time delay switches.*—Figure 4 shows a specific means of accomplishing this dual purpose. Blocking switch 31 is eliminated and each pair of leads to that switch (such as leads 16a and 27a) are connected directly to each other.

The time delay switch shown schematically in Figure 4 is opened by the dumping of scale pan 42, when the latter is moved by its associated dumper away from a horizontal position towards tilted position 42a. The switch remains open at least for the period of time a hopper requires to move from its first receiving position to beyond its last receiving position, less any time which elapses from the triggering of the dumper to the actuating of the time delay switch. The elapsed time last mentioned will not ordinarily be of any appreciable magnitude, but it can be so if the automatic dumper takes a relatively long time to be actuated after a triggering impulse is applied thereto.

(It is assumed throughout this specification that the containers provided beneath the chute discharge opening are all moved along the production line at the same rate of speed. If for some reason it is desired to vary the speed at which different containers in the series are moved beneath the chute, the periods of time specified for the embodiments of this invention employing time delay means will have to be adjusted. In some cases—such as the one just discussed—the period of time will be that required by the slowest moving hopper. As will be obvious to those skilled in the art, there will be other cases—such as the maximum limit on blocked time discussed in the next section of this specification—in which the period referred to will be that of the fastest moving hopper.)

The time delay switch of this embodiment has two sets of contacts, one set connected in series with leads 43 and one set in series with leads 44. Assuming that scale pan 42 shown in Figure 4 is associated with the second scale, leads 43 and 43a may be connected in series with the interlocking circuit of the first scale (for example, at some point in lead 10a) and leads 44 and 44a may be connected in series with the interlocking circuit of the third scale (for example, at some point in lead 15a).

When the time delay switch is actuated by the dumping of the second scale, this will render cocking relays 16 and 18 inoperative for a period sufficient to prevent additional dumping into the hopper then present under the chute. (It is evident that additional provision must be made in this embodiment for blocking the actuating of all dumpers if for any reason the moving line of hoppers comes to a stop.)

Similar time delay switches are connected from the scale pan of the first and third scales to the corresponding points in the circuits associated with the second and third scales, and the first and second scales, respectively.

*Maximum limit on blocked time.*—In addition to the minimum limit expressed above, there is a maximum limit on the period of time the other dumpers should be blocked out. The period should be no more than—and preferably less than—the time which elapses from the arrival of one hopper in its last receiving position to the arrival of the next hopper in its last receiving position. This maximum limit avoids the possibility that a hopper could be presented for filling and move on empty because the other scales were blocked out too long.

*Second dumping by same scale prevented.*—Although the time delay switch of this embodiment as so far described blocks out the other scales, it does not necessarily block out repeated operation of the same scale while a single hopper is moving under the chute discharge opening. It is seen that the embodiment described will be useful only if the time required for a scale pan (a) to be dumped, (b) to be returned to its waiting position, (c) to be filled with the required weight of material, and (d) to have its associated dumper put in a trigger condition is longer than the time the hopper is present under the chute.

*Last receiving position.*—With this embodiment, triggering switch 33 must be closed not only when the hopper arrives in its first receiving position under the chute, but also for a time thereafter so that any scale coming to balance after the hopper arrives may be dumped if the hopper has not yet been filled.

However, care should be taken to cause switch 33 to open after the hopper has passed the last point at which sufficient time remains for any of the dumpers to be actuated and the entire contents of the associated scale pan to be dumped, funneled through the chute, and deposited in the hopper.

For the purpose of this application, the point just described is referred to as the "last receiving position" of the receiving container.

Fifth embodiment

The time delay switch of Figure 4 may also be connected in series with the dumper actuating circuits themselves for the other scales.

Thus, leads 43 from a time delay switch associated with the second scale pan may be connected in series between contact 22 and dumper 1 (shown in Figure 1), and leads 44 in series between contact 30 and dumper 3.

Similar time delay switches and connections would of course be required for the scale pans of the first and third scales.

Sixth embodiment

Since the energizing circuit for each of the cocking relays also acts as an interlock circuit that renders the other cocking relays inoperative whenever one is energized, the necessary blocking out of the other two dumpers after one dumper has been actuated can be achieved by keeping the balance switch of the dumped scale pan closed for a period of time after the dumping.

This can be done by employing a time delay switch of conventional type as shown in Figures 2 and 4 as balance switches 10, 11, and 12. The time delay switch should open only after enough time has elapsed following the dumping of the associated scale pan to permit any hopper to move from its first receiving position to beyond its last receiving position.

In this embodiment, blocking switch 31 is omitted as in the two immediately preceding embodiments. Thus, this embodiment may be used only if no actuated dumper will return to a condition to be actuated again until after its associated balance switch has opened. This may be, for example, because the scale pan does not return to its position for receiving new material to be weighed until after such time.

Seventh embodiment

*Two scales in balance when no longer blocked out.*—It may happen with any of the first three embodiments described above that not one but two scales have come into balance by the time blocking switch 31 resumes its normally closed condition when a filled hopper leaves its last receiving position. This is especially likely if the series of hoppers moves along quite slowly under the chute opening, and so switch 31 remains open for a fairly long time. If there is any such "tie" between two balanced scales, the cocking relay to be first energized will be determined by the comparative speed with which the interlocking contacts (in Figure 1, contacts 24 and 27 for the first scale, 19 and 28 for the second scale, and 20 and 23 for the third scale) operate.

It may also happen with the fourth, fifth, or sixth embodiment described above that two scales have come into balance by the time the blocking effect of the time delay switch terminates. In any such case the interlocking contacts just referred to will be of importance in determining which cocking relay is to be energized next. In the fourth and fifth embodiments, the speed of operation of the contacts in the time delay switch will also be important.

It is quite possible that one or more of the various contacts mentioned will open (or, in the case of the contacts in the time delay switch, close) more quickly than the others. In any such case, one of the cocking relays will probably tend to be energized more quickly than the others and thereby to block the other relays out.

It follows that if a "tie" occurs at all frequently a particular one of the scales may not be caused to dump its contents its proportionate number of times. This, of course, would be an inefficient use of multiple scales.

*Preselection circuit.*—To avoid this result, it is desirable to employ what I call a preselection circuit. This preselection circuit reduces to almost a mathematical impossibility the chance of a "tie" of the kind just discussed.

Figure 5 shows an embodiment of this invention which includes the preselection feature.

Relays 45, 46 and 47 are preselection relays associated with the first, second and third scales, respectively.

Balance switches 48, 49 and 50 (similar to switches 10, 11 and 12 in the embodiment of Figure 1) are provided for the respective scales. Pairs of leads 51, 52 and 53 are connected to a suitable power supply.

Preselection relay 45 has two normally closed contacts 54 and 55 which are ganged for simultaneous operation. Preselection relay 46 has two similar contacts 56 and 57, and relay 47 has similar contacts 58 and 59. The relays are all connected as shown to provide interlock circuits that prevent any relay from becoming energized if another is already energized.

*Other relays.*—The first scale also has associated with it cocking relay 60, holding relay 61, time delay relay 62, and blocking relay 63. The second scale has associated with it similar relays 64, 65, 66, and 67. In the same way, the third scale has associated with it relays 68, 69, 70 and 71.

All these relays are connected to their respective preselection relays and automatic dumpers in the same fashion, so the particular connections will be described only for the parts associated with the second scale in Figure 5.

*Condition of circuit as shown.*—The circuit of this invention is shown in Figure 5 in the condition it occupies a moment after balance switch 49 has been closed by the balancing of the second scale, and relays 46, 64, and 65 have been energized. Normally closed contacts 56 and 57 of preselection relay 46 have been opened, normally closed contacts 72 and 73 of cocking relay 64 have been opened, and normally open contacts 78 and 79 of holding relay 65 have been closed.

The closing of contact 79 has started current to flow through the energizing coil of time delay relay 66, but the coil has not yet caused contacts 80 and 81 to move from their normal closed and open positions, respectively.

*Cocking relays.*—Cocking relays 60, 64 and 68 are interlocked in the same way as preselection relays 45, 46 and 47. Thus, current flowing from cocking relay 64 to its power supply must pass through contact 84 of relay 60 and contact 85 of relay 68.

Also included in the interlock circuit for cocking relay 64 is normally open contact 74 associated with blocking relay 67. When a hopper is in position under the chute to receive the contents of a scale pan, normally closed blocking switch 75 is caused to open. This de-energizes blocking coil 67 and permits contact 74 to open. It will be seen that this prevents cocking relay 64 from being actuated.

*Blocking and triggering switches.*—Blocking switch 75 is ganged for simultaneous action with normally open triggering switch 76. Both these switches are connected across suitable power supplies, as indicated at the bottom of the right side of Figure 5.

When the hopper moves beyond its last receiving position under the chute, blocking switch 75 closes and triggering switch 76 opens. The former energizes blocking coil 67, closes contact 74, and makes it possible once again to energize cocking relay 64.

*Holding relay.*—When relay 64 is energized, lead 77 to the bottom side of holding relay 65 causes current to flow through relay 65 at the same time. As a result, normally open holding contact 78 closes.

*Time delay relay.*—At the same time that contact 78 closes, normally open contact 79 is also closed. This energizes time delay relay 66, and a moment later normally open contact 81 closes to place dumper 2 in its trigger condition.

*Preselection relay de-energized.*—At the same time, normally closed contact 80 of time delay relay 66 opens, and preselection relay 46 is de-energized. This removes the blocking effect of the interlock circuit between relay 46 and the other preselection relays.

Whichever one of the scales next comes into balance can then have its preselection relay energized, even though the second dumper—which was put in trigger condition as just described—remains in its trigger condition waiting to be actuated by triggering switch 76 upon arrival of a hopper for filling.

*Operation.*—Tracing with more particularity the current that flows in the circuit of Figure 5 as a result of the closing of balance switch 49 when the second scale comes into balance, it is seen that current flows through lead 82, normally closed contact 54, lead 83, and normally closed contact 59 to the top lead of the energizing coil of preselection relay 46. From relay 46 it flows through normally closed contact 80 of time delay relay 66, and from there back to the power supply.

At the same instant, current flows from contact 59 of relay 47 to the top leads of cocking relay 64 and holding relay 65. From the bottom lead of the energizing coils of these two relays, current flows through normally closed contact 84 of cocking relay 60, normally closed contact 85 of relay 68, contact 74 of blocking relay 67, and to the power supply.

When holding relay 65 is energized, contacts 78 and 79 close. After they have closed, current will flow through balance switch 49 directly to the top leads of the energizing coils of relays 64 and 65.

As soon as relay 64 has been placed in direct contact with the power supply through balance switch 49, preselection relay 46 may be de-energized. The closing of contact 79, energizing of relay 66, and resulting opening of contact 80 accomplish this.

*Effect of preselection.*—It is seen that only a very short time elapses after the energizing of preselection relay 46 until contact 81 closes to place dumper 2 in its trigger condition, and simultaneously to return preselection relays 45 and 47 to a condition for being energized.

It is only during this very brief time that a "tie" might develop between the closing of balance switches 48 and 50, with the results referred to above. The shortness of this time virtually eliminates the possibility of any such tie.

It should also be noted in passing that because contacts 72 and 73 are already open during the moment of time after the energizing of cocking relay 64 the interlock circuit of said relay is just as effective then as later, even though the associated dumper is not yet in its trigger condition. In other words, other dumpers are barred from being placed in their trigger condition just as effectively while the dumper for the second scale is taking the last step for being placed in its trigger condition as they are after it has been placed in such condition.

*Certain relays combined.*—A relay having four ganged contacts (two normally closed and two normally open) may of course be substituted for the two relays 64 and 65 shown in the embodiment of Figure 5. A fifth ganged contact could even be added to relay 64 by transferring contact 81 from relay 67.

The important consideration is that holding contact 78 must be closed before contact 80 opens and de-energizes preselection relay 46. The time delay introduced by the energizing of the coil of relay 66 and the operation of the moveable element in contact 80 assure this.

Eighth embodiment

*Additional preselection.*—If it is not uncommon for the scales with which the automatic dumping selector of this invention is used to be loaded (after being dumped) and brought into balance again very quickly in comparison with the period of time the blocking switch is kept open by the presence of a hopper under the scales, the preselection feature of the last embodiment described may not be sufficient to avoid a "tie" between two balanced scales. If all three scales are in balance while a filled hopper is still under the chute, the preselection relay of one of the scales (for example, relay 45 in Figure 5) will be energized and lock out the other two preselection relays (for example, relays 46 and 47). When the hopper moves on, the associated cocking relay (relay 60 in Figure 5) will be energized, along with one of the other two preselection relays. Of the two latter relays, the one energized will always be the one having the faster operating interlock circuit.

There is another situation in which the preselection feature of the preceding embodiment also fails to insure that a "tie" will never develop between balanced scales. The present invention has so far been discussed for use with only three scales. If the number of scales used is greater, a "tie" may still sometimes occur with the embodiment just described, if two or more scales come into balance while a scale is being dumped, and another is already in balance waiting to be dumped.

In either of the cases referred to, it may be desirable to incorporate one or more additional preselection stages in the circuit of this invention.

Figures 6 and 6a should be read together with Figure 6a as a continuation at the bottom of Figure 6 as the complete figure, that is, 6 and 6a show how this invention may be used with two preselection stages. To read the figures together, the circuit of Figure 6 should be connected to Figure 6a at points A through F, and leads A through I.

It will be seen that contact 81 of time delay relay 66 appears on Figure 6, as well as the corresponding second contacts of relays 62 and 70. Blocking relays 63, 67 and 71 are shifted, together with the remainder of the circuit shown below them in Figure 5, to the bottom of Figure 6.

In the combined circuit thus formed by Figures 5 and 6, relays 45, 46, and 47 are the preselection relays of the first stage, and relays 60, 64, and 68 are the preselection relays of the second stage. Relays 86, 87, and 88 are the cocking relays of this embodiment.

*Operation.*—The operation of the additional preselection stage (including relays 60, 64, and 68 and their associated circuits) need not be described in detail, as it is the same as the operation of about the first three-quarters of the same circuits—down through the first contact (e. g., 80 of relay 66) of relays 62, 66, and 70—when they functioned as the cocking circuits of Figure 5 alone.

The operation of cocking relays 86, 87, and 88 (and their associated circuits) of combined Figures 5 and 6 is even more nearly like the operation of relays 60, 64, and 68 (and their associated circuits) when the latter functioned as the cocking circuits of Figure 5 alone. The only exception is the way current for energizing the cocking relays of the combined figures flows from the balance switches to the relays. Curent flows, for example, from balance switch 49 to cocking relay 87 through contact 81 in the second preselection stage of the combined circuit of Figures 5 and 6, rather than through a circuit like that of lead 82, contact 54 of relay 45, lead 83, and contact 59 of relay 47 in the first preselection stage, which was its path to the cocking relay in the circuit of Figure 5 alone. In all other respects the operation of the cocking relays (and associated circuits) of the combined figures is the same as that of the cocking circuits of Figure 5 alone.

*Effect of additional preselection stages.*—It is seen that a moment after any relay other than one in the first preselection stage is energized and its associated holding means is actuated, the associated relay of the preceding stage is de-energized. The cycle leading to placing a dumper in its trigger condition may then progress one more step for the other scales as they come into balance. In other words, one new relay in each of the preselection stages will be energized, the order in which this occurs being determined by the order in which the scales have come into balance.

*Other embodiments*

The foregoing detailed description has been given for clearness of understanding only. No unnecessary limitations should be understood therefrom, as modifications will be obvious to those skilled in the art.

I claim:

1. An automatic dumping selector for use with a plurality of scales having scale pans adapted to dump the contents thereof into a discharge chute leading to a series of containers beneath said scales comprising: an automatic dumper for each of said scales, said dumper having a trigger condition; means for providing a series of containers under the scales, each of said containers having at least one position in which it will receive the contents of any scale pan when the pan is dumped into a discharge chute; a normally open balance switch for each scale, said switch being adapted to be closed when the contents of the scale pan equal at least a predetermined weight; readying means for each dumper, said means being normally adapted to place the dumper in its trigger condition whenever the associated balance switch is in a closed condition, if there is no other dumper already in its trigger condition; blocking; blocking means adapted to prevent said readying means from placing any dumper in its trigger condition until after the container filled by the next preceding dumping of a scale pan has moved beyond its last receiving position; and triggering means responsive to the presence of a container in a receiving position under the scales to actuate any dumper which is in its trigger condition.

2. The automatic dumping selector of claim 1 in which said readying means continuously urges the associated dumper into its trigger condition by stages which can be occupied by the readying means of only one dumper at a time whenever its associated balance switch is in a closed condition.

3. The automatic dumping selector of claim 1 in which said readying means continuously urges the associated dumper into its trigger condition by stages which can be occupied by the readying means of only one dumper at a time, the order in which said stages are occupied by the readying means associated with the various scales being the same as the order in which the respective scales come into balance, whenever its associated balance switch is in a closed condition.

4. The automatic dumping selector of claim 1 in which said readying means includes at least one stage having a preselection relay for each scale, each relay in the first stage being normally adapted to be energized whenever its associated balance switch is closed; first interlocking means operative to prevent said relay from being energized if there is another preselection relay in the first stage already energized; a final stage having a cocking relay for each dumper; second interlocking means connecting each of said preselection and cocking relays except those in the first preselection stage with the other relays in the same stage and with the associated relay in the next preceding stage, said means being operative to energize each of said preselection and cocking relays whenever said preceding relay is energized, if there is no other relay in said same stage already energized; holding means for each relay except those in the first preselection stage, said means being normally adapted to keep the relay energized, once it is placed in such condition, for at least as long as the associated balance switch remains closed; time delay means for each relay except those in the first preselection stage, said means being adapted to render the associated relay of the next preceding stage inoperative a moment after said holding means is actuated; and connecting means for each dumper adapted to place the dumper in its trigger condition whenever the cocking relay associated therewith is energized.

5. The automatic dumping selector of claim 1 in which said blocking means prevents any dumper from being placed in its trigger condition during at least a part of the time a container is in position under the scales to receive the contents of a scale pan.

6. The automatic dumping selector of claim 1 in which (1) each of said readying means includes holding means adapted to keep the readying means in an energized condition, once placed in such condition, for at least as long as the balance switch associated therewith remains closed, and (2) said blocking means includes a normally closed switch adapted to open whenever a container is in position under the scales to receive the contents of a scale pan, said switch being connected in series with each of the energizing circuits for the readying means.

7. The automatic dumping selector of claim 1 in which said blocking means includes a normally closed time delay switch connected in series with each of the energizing circuits for the readying means, said switch being adapted to remain closed, after said triggering means is actuated, for a time long enough to permit any dumper then in a trigger condition to be actuated but to open before any other dumper can be placed in its trigger condition and actuated.

8. The automatic dumping selector of claim 1 in which said blocking means includes time delay means for each scale, said time delay means being adapted to be actuated at least as soon as the balance switch associated therewith is opened and to render all dumpers other than the actuated dumper inoperative, after said balance switch is opened, for at least the time required for the slowest moving container of said series to move from its first receiving position to beyond its last receiving position, less the elapsed time from the triggering of said dumper to the opening of said balance switch.

9. The automatic dumping selector of claim 1 in which said readying means includes a cocking relay for each dumper; means connecting each cocking relay at least with its associated balance switch and with the cocking relays for the other dumpers, said means being normally operative to energize said cocking relay whenever its associated balance switch is in a closed condition if there is no other cocking relay already energized; and connecting means for each dumper adapted to place the dumper in its trigger condition whenever the cocking relay associated therewith is energized.

10. The automatic dumping selector of claim 9 in which said blocking means includes time delay means for each scale, said time delay means being adapted to be actuated at least as soon as the balance switch associated therewith is opened and to render the cocking relays which are associated with all dumpers other than the actuated dumper inoperative, after said balance switch is opened, for at least the time required for the slowest moving container of said series to move from its first receiving position to beyond its last receiving position, less the elapsed time from the triggering of said dumper to the opening of said balance switch.

11. The automatic dumping selector of claim 9 in which said blocking means includes time delay means for each scale, said time delay means being adapted to keep the balance switch associated therewith closed, after its associated dumper is actuated, for at least the time required for the slowest moving container of said series to move from its first receiving position to beyond its last receiving position, less the elapsed time from the triggering of said dumper to the actuating of the dumper.

References Cited in the file of this patent

UNITED STATES PATENTS

| | | |
|---|---|---|
| 1,667,930 | Edmunds | May 1, 1928 |
| 2,076,640 | Howard | Apr. 13, 1937 |
| 2,398,887 | Drinnon | Apr. 23, 1946 |
| 2,608,372 | Ferguson et al. | Aug. 26, 1952 |